(12) United States Patent
Chen et al.

(10) Patent No.: US 11,147,095 B2
(45) Date of Patent: Oct. 12, 2021

(54) TRANSMITTING AND RECEIVING CONTROLLING INFORMATION IN WIRELESS COMMUNICATIONS

(71) Applicant: ZTE Corporation, Guangdong (CN)

(72) Inventors: Xianming Chen, Guangdong (CN); Bo Dai, Guangdong (CN); Kun Liu, Guangdong (CN); Weiwei Yang, Guangdong (CN); Huiying Fang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 96 days.

(21) Appl. No.: 16/785,553

(22) Filed: Feb. 7, 2020

(65) Prior Publication Data

US 2020/0178284 A1    Jun. 4, 2020

Related U.S. Application Data (63) Continuation of application No. PCT/CN2017/096866, filed on Aug. 10, 2017.

(51) Int. Cl.
*H04W 4/00* (2018.01)
*H04W 72/12* (2009.01)
(Continued)

(52) U.S. Cl.
CPC ....... *H04W 72/1284* (2013.01); *H04L 5/0055* (2013.01); *H04W 72/042* (2013.01); *H04W 72/0446* (2013.01)

(58) Field of Classification Search
CPC ........... H04W 72/1284; H04W 72/042; H04W 72/0446; H04L 5/0055; H04L 5/0091;
(Continued)

(56) References Cited

U.S. PATENT DOCUMENTS

2014/0348091 A1    11/2014   Seo et al.
2016/0081122 A1*   3/2016    Tang ................. H04W 72/0413
                                                       370/329
(Continued)

FOREIGN PATENT DOCUMENTS

CN         102823183 A     12/2012
CN         103354482 A     10/2013
(Continued)

OTHER PUBLICATIONS

ZTE, "Detail den on UL HARQ-ACK feedback enhancement for MTC", R1-1707091, May 15-19, 2017 (From Applicant's IDS) (Year: 2017).*

(Continued)

*Primary Examiner* — Mang Hang Yeung
(74) *Attorney, Agent, or Firm* — Perkins Coie LLP (57) ABSTRACT

This disclosure provides techniques for reducing waste of user equipment (UE) resources caused in transmission of a Physical Uplink Shared Channel (PUSCH) when a UE conducts searching for downlink control information (DCI) outside of a PUSCH transmission. This disclosure defines a first search space on the basis of an existing second search space that was used to receive DCI information to schedule a PUSCH. The first search space can be used to obtain a DCI having an ACK feedback. This disclosure provides systems and methods for determining the location of the first search space to receive a second DCI having ACK feedback during a PUSCH repetitive transmission and whether the second search space should be used for the second DCI instead. Outside of the PUSCH transmission, the UE receives DCI in the second search space, decreasing the unnecessary searching of DCI and increasing network efficiency.

14 Claims, 9 Drawing Sheets

(51) Int. Cl.
*H04L 5/00* (2006.01)
*H04W 72/04* (2009.01)

(58) Field of Classification Search
CPC ... H04L 5/0007; H04L 5/0053; H04L 1/1861; H04L 1/1864; H04L 1/1893; H04L 1/08
USPC .......................................................... 370/329
See application file for complete search history.

(56) References Cited

U.S. PATENT DOCUMENTS

| | | |
|---|---|---|
| 2016/0128055 A1 | 5/2016 | Xiong et al. |
| 2018/0219649 A1* | 8/2018 | Ying .................... H04L 1/1819 |
| 2020/0128574 A1* | 4/2020 | Suzuki .................. H04L 1/1819 |

FOREIGN PATENT DOCUMENTS

| | | |
|---|---|---|
| CN | 103782640 A | 5/2014 |
| CN | 105634689 A | 6/2016 |
| CN | 106797618 A | 5/2017 |
| EP | 2 555 459 A2 | 2/2013 |
| EP | 2 955 864 A1 | 12/2015 |
| WO | 2016/073591 A1 | 5/2016 |
| WO | 2017026971 A1 | 2/2017 |

OTHER PUBLICATIONS

Office Action for Chinese Patent Application No. 201780093829.2, dated Oct. 26, 2020.
ZTE, "Detailed design on UL HARQ-ACK feedback enhancement for MTC," 3GPP TSG RAN WG1 Meeting #89, Hangzhou, China, R1-1707091, pp. 1-5, May 2017.
LG Electronics, "Discussion on PUSCH transmissions for MTC," 3GPP TSG RAN WG1 Meeting #82bis, Malmo, Sweden, R1-155369, pp. 1-3, Oct. 2015.
Extended European Search Report for European Patent Application No. 17921316.0, dated Jun. 24, 2020.
International Search Report and Written Opinion dated May 3, 2018 for International Application No. PCT/CN2017/096866, filed on Aug. 10, 2017 (7 pages).

* cited by examiner

| "00" | Receive DCI bearing ACK Feedback in a Second Search Space |
| "01" | Receive DCI bearing ACK Feedback in a First Search Space at Position X |
| "10" | Receive DCI bearing ACK Feedback in a First Search Space at Position Y |
| "11" | Receive DCI bearing ACK Feedback in a First Search Space at Position Z |

| | |
|---|---|
| "00" | Receive DCI bearing ACK Feedback in a Second Search Space |
| "01" | first search space appears every N/2 sub-frames and starts to appear at the sub-frame whose number is N/2 |
| "10" | first search space appears every N/4 sub-frames and starts to appear at the sub-frames whose number are N/4, N/2, and 3N/4 |
| "11" | the first search space appears every N/8 sub-frames and starts to appear at the sub-frames whose number are N/8, N/4, 3N/8, N/2, 5N/8, 3N/4, and 7N/8 |

| | |
|---|---|
| "00" | First Search Space Occurs Every N/2 Sub-Frames |
| "01" | First Search Space Occurs Every N/4 Sub-Frames |
| "10" | First Search Space Occurs Every N/8 Sub-Frames |
| "11" | Reserved |

TRANSMITTING AND RECEIVING CONTROLLING INFORMATION IN WIRELESS COMMUNICATIONS

CROSS REFERENCE TO RELATED APPLICATIONS

This patent document is a continuation of and claims benefit of priority to International Patent Application No. PCT/CN2017/096866, filed on Aug. 10, 2017. The entire content of the before-mentioned patent application is incorporated by reference as part of the disclosure of this application.

TECHNICAL FIELD

The disclosure relates to the field of wireless communication technology, and more particularly, to a method and apparatus for transmitting and receiving controlling information.

BACKGROUND

In wireless communications, a mobile station or user equipment (UE) transmits to a serving base station (BS) via a wireless uplink and receives transmissions from the serving base station via a wireless downlink.

BRIEF SUMMARY

The technology disclosed in this patent document provides techniques for transmission from a UE to a serving BS and from a BS to a UE. Implementations of the disclosed technology can be used to efficiently manage transmissions to reduce power consumption at the UE and thus extend the operating time of the power supply of the UE.

In one example aspect, a method of a for receiving controlling information at a user equipment (UE) is disclosed. The method includes receiving, from a base station (BS), a first control information in a second search space in at least one sub-frame, wherein the first control information comprises information relating to scheduling of a transmission from the UE to the BS, transmitting the transmission at least once, wherein the transmission utilizes one or more sub-frames, the one or more sub-frames of the transmission has a different time domain position than the first control information's at least one sub-frame, and receiving, a second control information in a first or the second search space during the transmission, wherein the second control information comprises an ACK feedback that acknowledges that the BS received the transmission.

In another example, aspect the transmission is a Physical Uplink Shared Channel (PUSCH). In yet another example aspect, the second control information is received in the second search space. In another example aspect, the second search space utilizes a sub-frame that is different than the sub-frame utilized by the first search space in the time-domain. In another example aspect, the first control information further comprises a field value that indicates whether the second control information will be received in the first or second search space. In another example aspect, the second control information is received in the first search space.

In another example aspect, the method further includes determining whether to receive the second control information in the first or second search spaces, the determining comprising receiving a signal that indicates a PUSCH repetitive transmission number, receiving a signal that indicates the time-domain interval number of the second search space; and determining, based on the PUSCH repetitive transmission number and the time-domain interval number of the second search space, whether the second control information will be received in the first search space or the second search space. In yet another example aspect, the method further includes determining whether to receive the second control information in the first or second search spaces, the determining comprising receiving a signal that describes a PUSCH repetitive transmission number, receiving a signal that describes the time-domain interval number of the second search space, receiving a signal that describes the number of sub-frames in the first or second search space, and determining, based on the PUSCH repetitive transmission number, the time-domain interval number of the second search space, and the number of sub-frames in the first or second search space, whether the second control information will be received in the first search space or the second search space.

In another example aspect, first search space's time-domain position is indicated by a field in the first control information. In yet another example aspect, the first search space's time-domain position is indicated by a field in a Radio Resource Control (RRC) message. In yet another example aspect, the method further includes receiving a signal that indicates a PUSCH repetitive transmission number, and determining a time-domain position of the first search space based on the PUSCH repetitive transmission number. In yet another example aspect, the method further includes receiving a signal that indicates a PUSCH repetitive transmission number, receiving a signal that indicates the number of sub-frames in the first or the second search space, and determining time-domain position of the first search space based on the PUSCH repetitive transmission number and the number of sub-frames in the first or second search space.

In yet another example embodiment, a user equipment comprises an antenna configured to receive communication signals from a base station (BS) and a processor configured to receive a first control information in a second search space, where the first control information comprises information relating to scheduling of a transmission from the UE to the BS, transmit the transmission at least once, where the transmission utilizes one or more sub-frames, the one or more sub-frames of the transmission has a different time domain position than the first control information's at least one sub-frame, and receive a second control information in a first or the second search space during the transmission, where the second control information comprises an ACK feedback that acknowledges that the BS received the transmission.

In yet another aspect of the disclosure is a method for transmitting controlling information from a base station (BS). The method includes transmitting, a first control information in a second search space in at least one sub-frame, wherein the first control information comprises information relating to scheduling of a transmission from a user equipment (UE) to the BS, receiving, from the UE, the transmission at least once, wherein the transmission utilizes one or more sub-frames, the one or more sub-frames of the transmission has a different time domain position than the first control information's at least one sub-frame; an, transmitting, a second control information in a first or the second search space during the transmission, wherein the second control information comprises an ACK feedback that acknowledges that the BS received the transmission.

In yet another example aspect, a base station (BS) apparatus comprises an antenna configured to transmit communication signals to a user equipment (UE) and a processor configured to transmit a first control information in a second search space, where the first control information comprises information relating to scheduling of a transmission from the UE to the BS, receive the transmission at least once during the transmission, where the transmission utilizes one or more sub-frames and the first control information is received outside of the transmission, and transmit a second control information in a first or the second search space during the transmission, where the second control information comprises an ACK feedback that acknowledges that the BS received the transmission.

In yet another example aspect, a wireless communications apparatus comprising a processor is disclosed, the processor is configured to perform the method. In another example aspect, the various techniques described herein may be embodied as processor-executable code and stored on a computer readable program medium.

The details of one or more implementations are set forth in the accompanying drawings and description below. Other features will be apparent from the description and drawings, and from the claims.

DETAILED DESCRIPTION

In some wireless networks, e.g., an implementation of the 3GPP Rel-14 standard, a repetitive transmission mechanism is introduced to achieve coverage enhancement. For example, User Equipment (UE) engages in repetitive transmission in the Physical Uplink Shared Channel (PUSCH). The PUSCH contains user information and control signal data from the UE and is communicated from a UE to a base station (BS). The PUSCH occupies one or more sub-frames and its transmission occurs repetitively. During repetitive transmission, the UE does not receive an acknowledgement (ACK) feedback response from the BS corresponding to the PUSCH during the PUSCH repetitive transmission. Even if the PUSCH transmission is successfully decoded by the network, the UE cannot end the PUSCH repetitive transmissions. Unnecessary repetitive transmission of the PUSCH wastes bandwidth and power of the UE.

This disclosure provides an apparatus and methods for a UE to receive, and a BS to transmit, downlink control information (DCI) having ACK feedback in different possible search spaces to reduce unnecessary repetitive PUSCH transmission and search space scanning, outside of the PUSCH repetitive transmission, by the UE. This disclosure describes systems and methods for decreasing a first search period of a search space during a PUSCH repetitive transmission, while maintaining a larger search period outside of PUSCH repetitive transmission.

Furthermore, this disclosure also describes how the UE can determine which search space will have a DCI ACK feedback, thereby reducing resources wasted by a UE that would otherwise occur through the searching for DCI outside of a PUSCH repetitive transmission.

The disclosed technology can be used to provide uplink transmissions from UE to a base station to reduce the unnecessary uplink transmission time in different ways as explained in the examples below. Although described in more detail with respect to the UE's transmission and reception of signals, it should be understood that the disclosure equally applies to the BS's reception and transmission of signals.

In an embodiment, the UE receives downlink control information (DCI) that has information that schedules a Physical Uplink Shared Channel (PUSCH). The DCI is transmitted outside of the PUSCH transmission. The UE transmits the PUSCH to the BS until ACK feedback is received. Once an ACK feedback is received, the UE stops the PUSCH transmission in order not to waste resources unnecessarily.

In an embodiment, the UE receives an ACK feedback in a second subsequent DCI. The second DCI can be sent in either a first or second search space. Allowing the UE to receive and determine whether to use the first or second search space to receive the second DCI in avoids wasting power consumption by unnecessarily searching to receive DCI outside of the PUSCH transmission. In an embodiment, the first search space appears during the PUSCH repetitive transmission. In another embodiment, the second search space is configured to occur periodically.

In an embodiment, a first DCI having scheduling for the PUSCH is received in a second search space and the second DCI having an ACK feedback is received in a first search space. In yet another embodiment, a first DCI having scheduling for the PUSCH is received in a second search space and the second DCI having an ACK feedback is also received in the second search space.

According to an embodiment of the disclosure, the UE determines whether a second DCI having an ACK feedback should be received in a first or second search space based on several different factors. In an embodiment, the field of the first DCI is used to indicate whether the UE receives the second DCI in the first or second search space during a PUSCH repetitive transmission. The first DCI is received in the second search space outside of the PUSCH repetitive transmission. In an embodiment, the field also indicates the time-domain position of the first search space. In an embodiment, the time domain position of the first search space is determined through the configuration of a Radio Resource Control (RRC) message received at the UE from the BS.

In another embodiment, the UE determines whether to receive a second DCI having ACK feedback in the first or second search space based on the number of PUSCH repetitive transmissions and the interval of the second search space. In another embodiment, the UE determines whether to receive a second DCI having ACK feedback in the first or second search space based on the number of the PUSCH repetitive transmission, the second search space interval, and the number of sub-frames in either search space.

The time domain position of the first search space (i.e., the location of the sub-frames bearing the ACK feedback) can be determined by the UE. In an embodiment, the time domain location of the first search space is determined through a field communicated in a DCI from the BS to the UE. In another embodiment, the time domain position of the first search space is determined according to the number of PUSCH repetitive transmissions, which represents how many times the PUSCH needs to be transmitted, and the number of sub-frames of the first or second search space. In another embodiment, the time domain position of the first search space is determined according to the number of PUSCH repetitive transmissions. The PUSCH can be transmitted via a certain amount of sub-frames and, in an embodiment, one sub-frame is occupied for one transmission of the PUSCH. The time domain interval of the first search space can be at an interval of N/2, N/4, N/8, etc. sub-frames, where N is the number of the PUSCH repetitive transmission. Various aspects of the disclosed technologies follow below.

Figure 1:
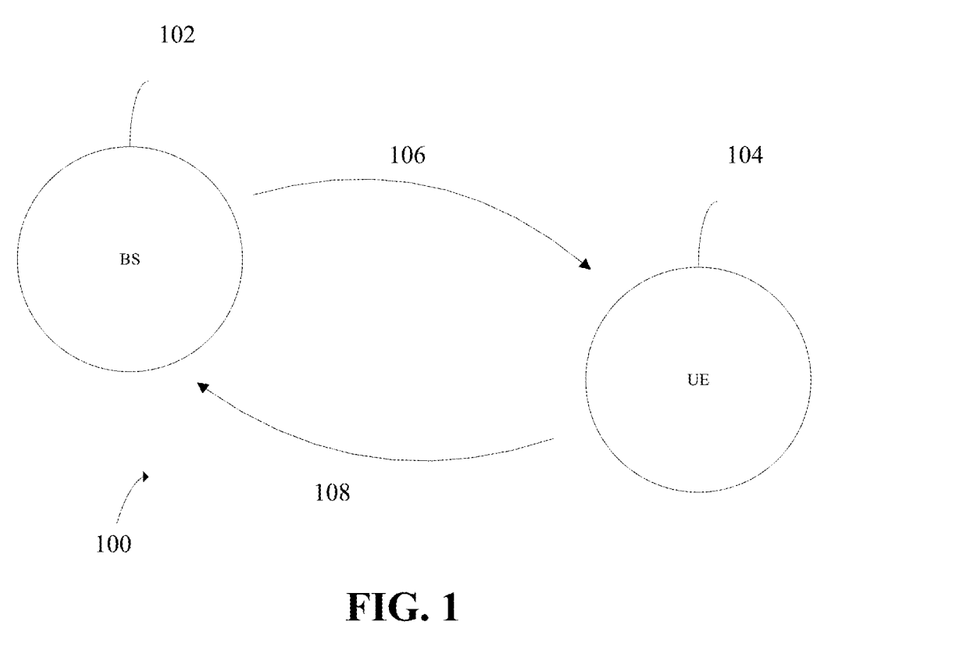
FIG. 1 illustrates an exemplary communication network in an orthogonal frequency division multiplexing (OFDM) network.

FIG. 1 illustrates an exemplary communication network 100 in an orthogonal frequency division multiplexing (OFDM) network. A BS 102 wirelessly communicates with a UE 104. The BS 102 wirelessly transmits downlink communications 106 to the UE 104, and the UE 104 wirelessly transmits uplink communications 108 to the BS 102. The downlink communications 106 includes various data, control, and other types of signals, including the DCI which contains transmission resource assignments and other control information for UEs, including information regarding the scheduling of the PUSCH. The downlink communications 106 also includes DCI information containing ACK feedbacks, which acknowledge the PUSCH. The uplink communications 108 includes various data, control, and other types of signals, including the PUSCH which contains user information and control signal data. Although not illustrated or described, many other types of data and control signals are communicated on the downlink and uplink communications 106 and 108.

Figure 2:
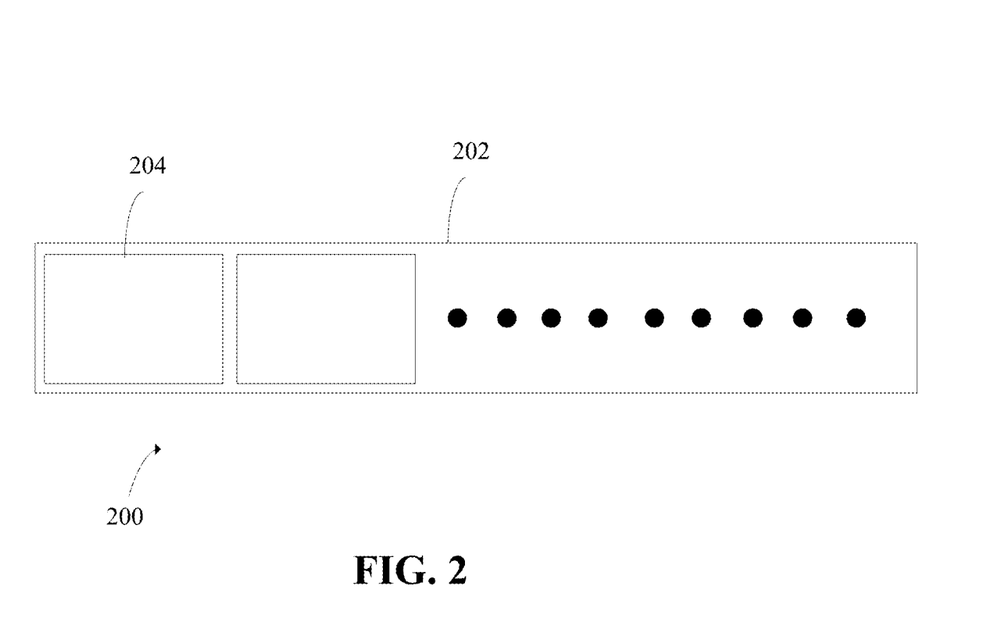
FIG. 2 illustrates an exemplary frame structure transmitted in an OFDM-based network.

FIG. 2 illustrates an exemplary frame structure 200 transmitted in an OFDM-based network. A frame 202 comprises one or more sub-frames 204. The frame structure 200 includes other components known to those with skill in the art. For the sake of simplicity, only the frame 202 and sub-frame 204 have been discussed. The sub-frames 204 include one or more symbols (not pictured). This disclosure is not limited to this particular structure or components—the disclosure encompasses structures having additional structures.

A UE knows what frames and sub-frames to look at (i.e., search space[s]) in order to obtain various control and data signals. A frame of a DCI sent from a BS to a UE, for example, contains sub-frames for the UE to process and decode control information. In an embodiment, the search space has a DCI having an ACK feedback during the PUSCH transmission. The ACK feedback acknowledges receipt of the PUSCH. Reducing unnecessary transmission of PUSCH saves UE power and increases overall network efficiency. Similarly, reducing usage of search spaces outside of a PUSCH repetitive transmission improves network efficiency and UE power consumption.

Figure 3:
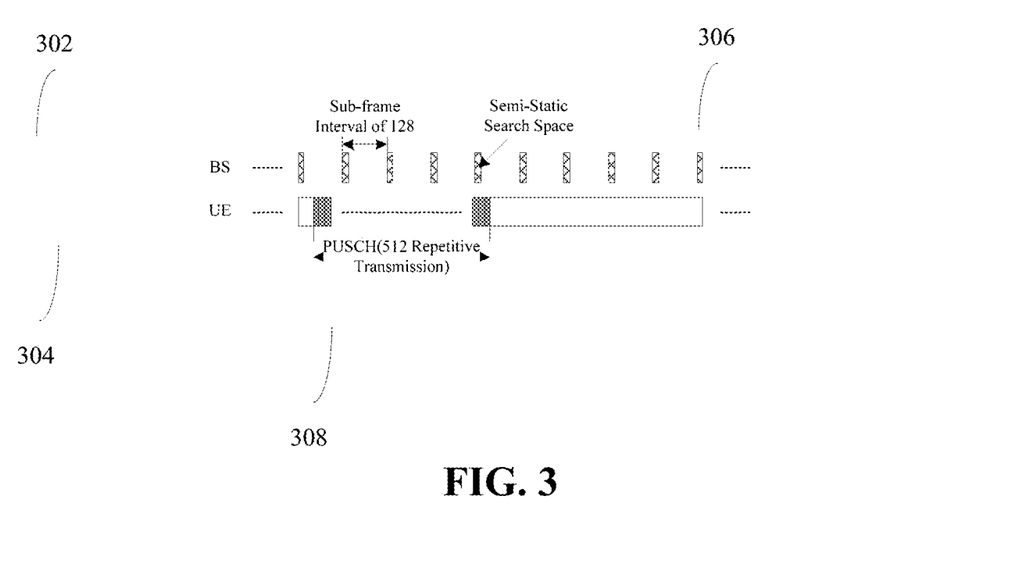
FIG. 3 illustrates an exemplary block diagram showing the transmission of sub-frames and PUSCH repetitive transmissions.

FIG. 3 illustrates an exemplary block diagram showing the typical transmission of sub-frames and a PUSCH repetitive transmission. The BS 302 transmits sub-frames 306 and the UE 304 transmits PUSCH repetitive transmissions 308. The sub-frames 306 can be seen as search spaces having a DCI that is transmitted by the BS. The PUSCH repetitive transmission occupies multiple sub-frames. A first DCI (not pictured) is communicated from the BS 302 to the UE 304 that contains various scheduling information for the UE 304. The first DCI (not pictured) also contains a field containing information regarding the repetitive transmission, such as the number of PUSCH repetitive transmission. Typically, the first DCI (not pictured) that schedules the PUSCH is received outside of the PUSCH repetitive transmission 308. The UE 304 uses information communicated in the DCI for subsequent communications. In the case that the sub-frames 306 communicated from the BS 302 have an ACK feedback in a second DCI, the UE interprets this information to stop the PUSCH repetitive transmissions 308. The second DCI occurs during the PUSCH repetitive transmission 308.

Illustrated here, the number of PUSCH repetitive transmissions is 512 and the time-domain interval of search spaces (i.e., interval of the sub-frames 306) that contain an ACK feedback is 128 sub-frames. In the case that a fixed sub-frame interval (e.g., every 128 sub-frames) is used as a search space interval, the UE will receive DCI at a fixed search space interval regardless of whether the UE is during a PUSCH repetitive transmission or not. In order to reduce power consumption as the result of a PUSCH repetitive transmission, the time-domain interval of the search space can be reduced to provide more opportunities for ACK feedback during PUSCH repetitive transmission. However, when there is not a PUSCH repetitive transmission occurring, using smaller search space intervals (e.g., every 128 sub-frames) will cause unnecessary power consumption of the UE and network inefficiencies because the UE must search for DCI in more sub-frames and more DCI frame and sub-frames will be reserved.

To prevent unnecessary waste of power and reducing network inefficiencies, according to an embodiment of the disclosed technology, the UE determines whether a second DCI having an ACK feedback should be received in a first or a second search space. Based on this determination, the UE receives a second DCI in a first or second search space. In an embodiment, the first search space appears during the PUSCH repetitive transmission. In another embodiment, the second search space is semi-statically configured to occur periodically and contains DCI information for scheduling the PUSCH. In an embodiment, the number of sub-frames occupied by the first search space is the same as the number of sub-frames occupied by the second search space.

In an embodiment, the BS 302 sends a first DCI to the UE 304 in the second search space to schedule the PUSCH. In an embodiment, a field in the first DCI is used to indicate whether the UE receives a second DCI in a first or second search space during the PUSCH repetitive transmission. The UE 304 receives the first DCI in the second search space and determines, based on the field of the first DCI, whether to receive the second DCI in the first or second search space during the PUSCH repetitive transmission. The second DCI has ACK feedback information.

In an embodiment, the field is 1 bit and indicates whether the UE will receive a second DCI in the first or second search space during the PUSCH repetitive transmission. For example, a "0" indicates that the UE will receive a second DCI in the first search space during the PUSCH repetitive transmission. A "1" indicates that the UE will receive a second DCI in the second search space. The second DCI is transmitted and received during the PUSCH repetitive transmission.

Figure 4:
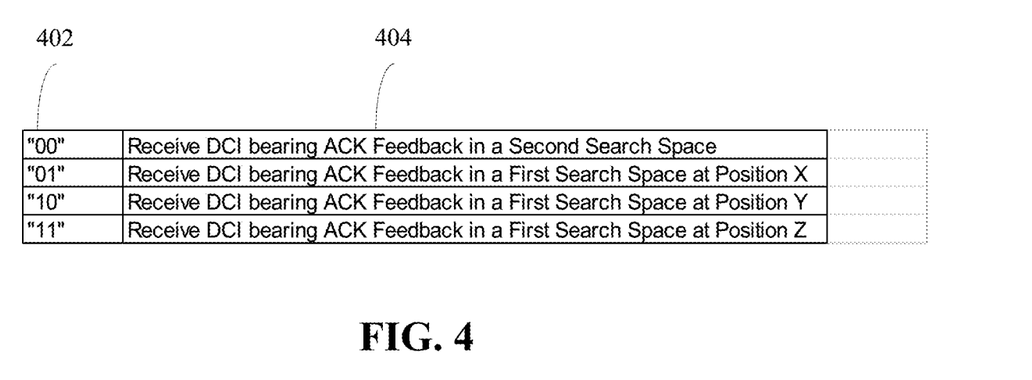
FIG. 4 illustrates field values that describe time-domain position of the search space bearing the ACK feedback.

In an embodiment, a first DCI communicated from a BS 302 to a UE 304 and received in the second search space also has a field that provides the UE with information regarding how and where (i.e., information regarding the search space) an ACK feedback will be communicated. FIG. 4 illustrates field values 402 and their corresponding interpreted functions 404. In an embodiment, the field in the DCI is 2 bits and indicates the time position of the search space to search for the DCI having ACK feedback. Three of the four states (e.g., "01," "10," "11") indicate that the UE receives the second DCI in a first search space, and the different states correspond to different time domain locations of the first search space (i.e., sub-frame positions that will bear the ACK feedback). The remaining state (e.g., "00") indicates that the UE receives the DCI in a second search space. It should be understood that the length of the bit field, its values, and the search spaces and time-domain positions the values represent are only exemplary. Furthermore, the location of the first and second search spaces can be predetermined or calculated by the UE.

Figure 5:
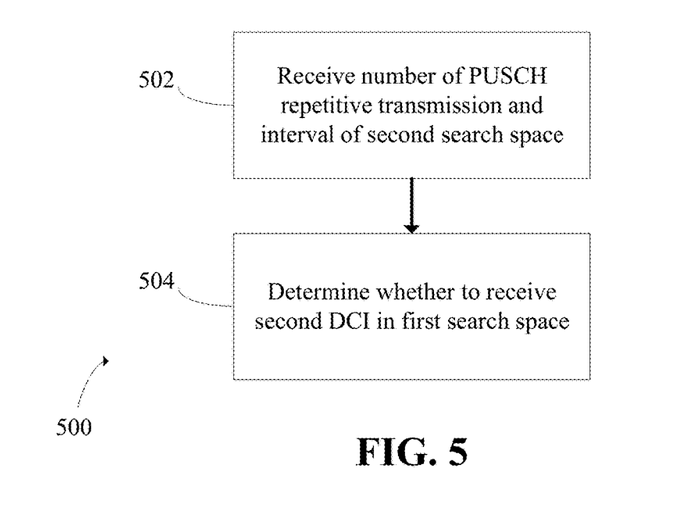
FIG. 5 illustrates an exemplary flowchart illustrating determination of a search space bearing an ACK feedback at the UE.

FIG. 5 illustrates an exemplary flowchart 500 illustrating whether to receive a second DCI in a first search space or a second search space. In step 502, the BS transmits the number of PUSCH repetitive transmissions and the interval of the second search space to the UE. In step 504, the UE determines, based on the received number of the PUSCH repetitive transmission and the interval of the second search space, whether to receive the second DCI in the first or second search space during the PUSCH repetitive transmission. In an embodiment, the first DCI having the scheduling information for the PUSCH is received in the second search space.

Figure 6:
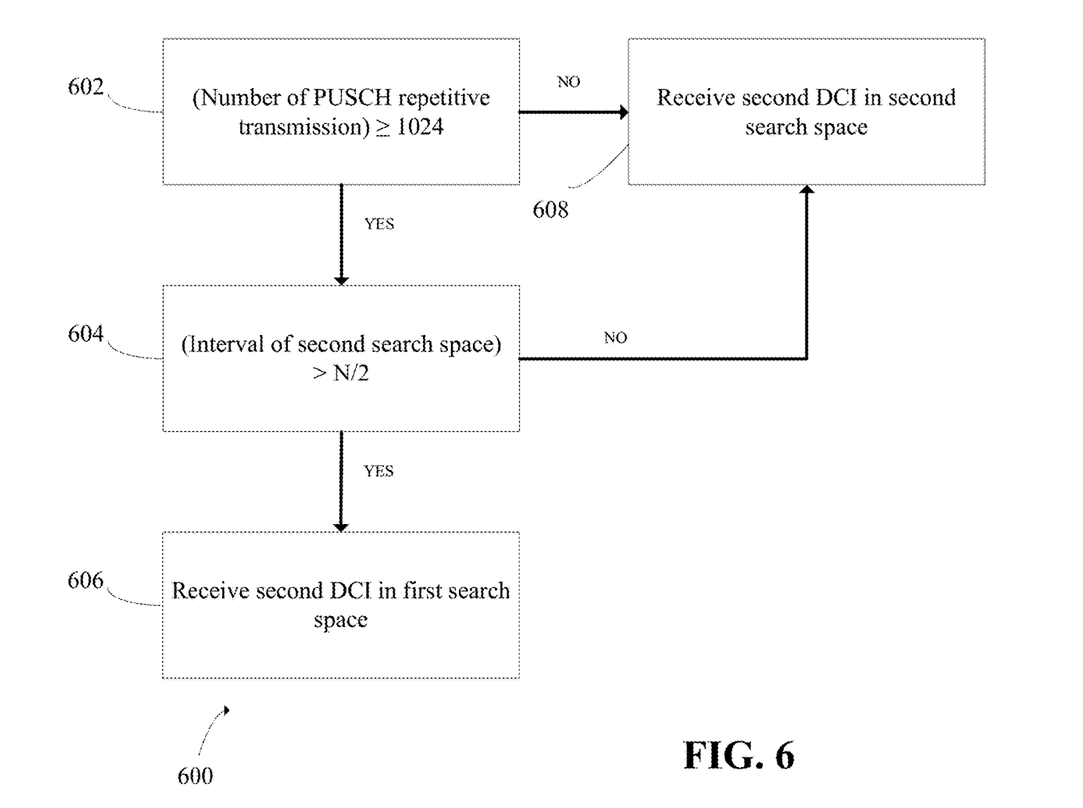
FIG. 6 illustrates an exemplary algorithm to determine whether a DCI bearing an ACK feedback is received in the first or second search space.

FIG. 6 illustrates an exemplary algorithm 600 to determine whether the second DCI bearing an ACK feedback is received in the first or second search space. As shown in step 602, the UE determines whether the PUSCH repetitive transmission number is equal to or greater than 1024 and, as shown in step 604, whether the interval of second search space is larger than N/2 (where N represents the number of PUSCH repetitive transmissions). As shown in Step 606, if both are true, then the UE determines that it receives the second DCI in the first search space during the PUSCH repetitive transmission. If either are not, as shown in Step 608, the second DCI is received in the second search space.

For example, in the case that the number of PUSCH repetitive transmissions is 1024 and the second search space interval is 1024 sub-frames, the UE determines that it is to receive the second DCI in the first search space during the PUSCH repetitive transmission because the interval of the second search space is greater than 512 (i.e., greater than N/2).

In another example, in the case that the number of PUSCH repetitive transmissions is 2048 and the second search space interval is 1024 sub-frames, the UE determines that it receives the second DCI in the second search space during the PUSCH repetitive transmission because the interval of the second search space is not greater than 1024 (i.e., not greater than N/2).

The above mentioned embodiments (i.e., number of PUSCH repetition transmissions being 1024 and the determination based on a search space interval larger than N/2) are merely illustrative. It should be understood that any number of PUSCH repetition transmissions and search space intervals can be used. Furthermore, it should be understood that the interval of the second search space, and the determination that the second DCI will be in the first or second search space, can be based on other numbers (i.e., greater than, less than, or equal to) than N/2.

Figure 7:
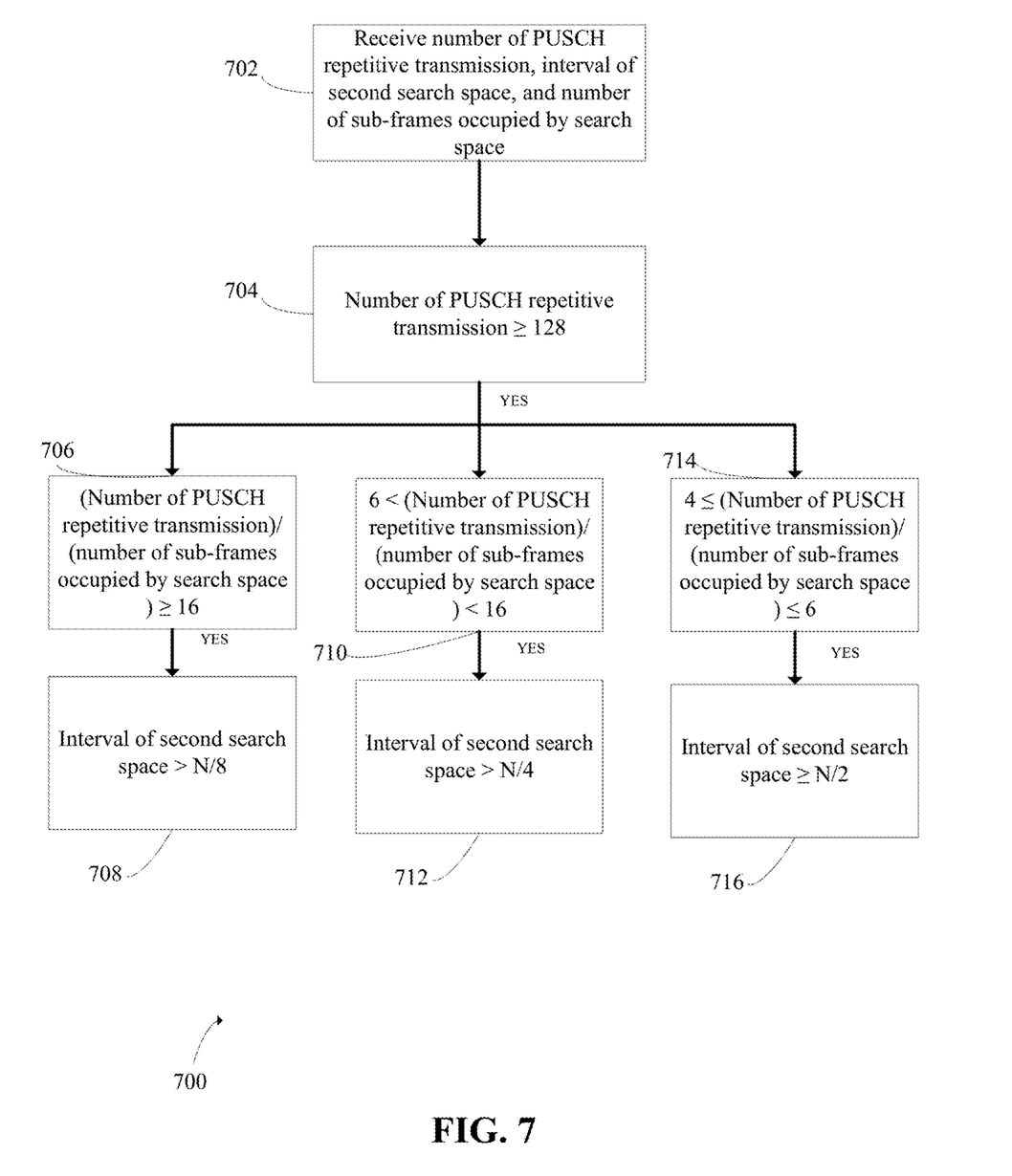
FIG. 7 illustrates another exemplary algorithm to determine whether a DCI bearing an ACK feedback is received in the first or second search space.

FIG. 7 illustrates another exemplary algorithm 700 to determine whether a second DCI bearing an ACK feedback is received in the first search space or second search space. As illustrated in step 702, the BS transmits the number of PUSCH repetitive transmissions, the interval of second search space, and the number of sub-frames occupied by the search space. Based on these received values, the UE determines whether to receive the second DCI in the first or second search space during the PUSCH repetitive transmission.

In an embodiment, the UE will determine to receive the second DCI in the first or second search space during the PUSCH repetitive transmission under many different scenarios. For example, as shown in Step 704, when the number of the PUSCH repetitive transmission is greater than or equal to 128 and either: (1) as shown in Step 706, the number of the PUSCH repetitive transmission divided by the number of sub-frames occupied by the search space is greater than or equal to 16 and, as shown in Step 708, the interval of the second search space is greater than N/8; or (2) as shown in Step 710: the number of the PUSCH repetitive transmission divided by the number of sub-frames occupied by the search space is less than 16 and greater than 6 and, as shown in Step 712, the interval of second search space is greater than N/4; or (3) as shown in Step 714: the number of the PUSCH repetitive transmission divided by the number of sub-frames occupied by the search space is less than or equal to 6 and is greater than or equal to 4 and, as shown in Step 716, the second search space interval is greater than N/2. If either of these scenarios is true, the UE will determine that it is to receive the second DCI bearing the ACK feedback in the first search space during the PUSCH repetitive transmission. If none of these scenarios is true, the UE will determine that it is to receive the second DCI bearing the ACK feedback in the second search space during the PUSCH repetitive transmission.

In an example, the (a) number of the PUSCH repetitive transmission is 512; (b) number of sub-frames occupied by the search space is 64; and (c) interval of the second search space is 512 sub-frames. In this case, because the number of the PUSCH repetitive transmission divided by the number of sub-frames occupied by the search space (i.e., 512/64) equals 8 and the interval of the second search space is greater than 128, the UE receives the second DCI in the first search space during the PUSCH repetitive transmission.

In another example, the (a) number of the PUSCH repetitive transmission is 1024; (b) number of sub-frames occupied by the search space is 64; and (c) interval of the second search space is 256 sub-frames. In this case, because the number of the PUSCH repetitive transmission divided by the number of sub-frames occupied by the search space (i.e., 1024/64) equals 16 and the interval of the second search space is greater than 128, the UE receives the second DCI in the first search space during the PUSCH repetitive transmission.

It should be understood that the number of the PUSCH repetitive transmission, number of sub-frames occupied by the search space, and intervals of the search spaces are only examples. It should also be understood that any relationship between these values is exemplary. Any numbers and relationships to determine whether a first or second search space is used for ACK feedback can be used.

Figure 8:
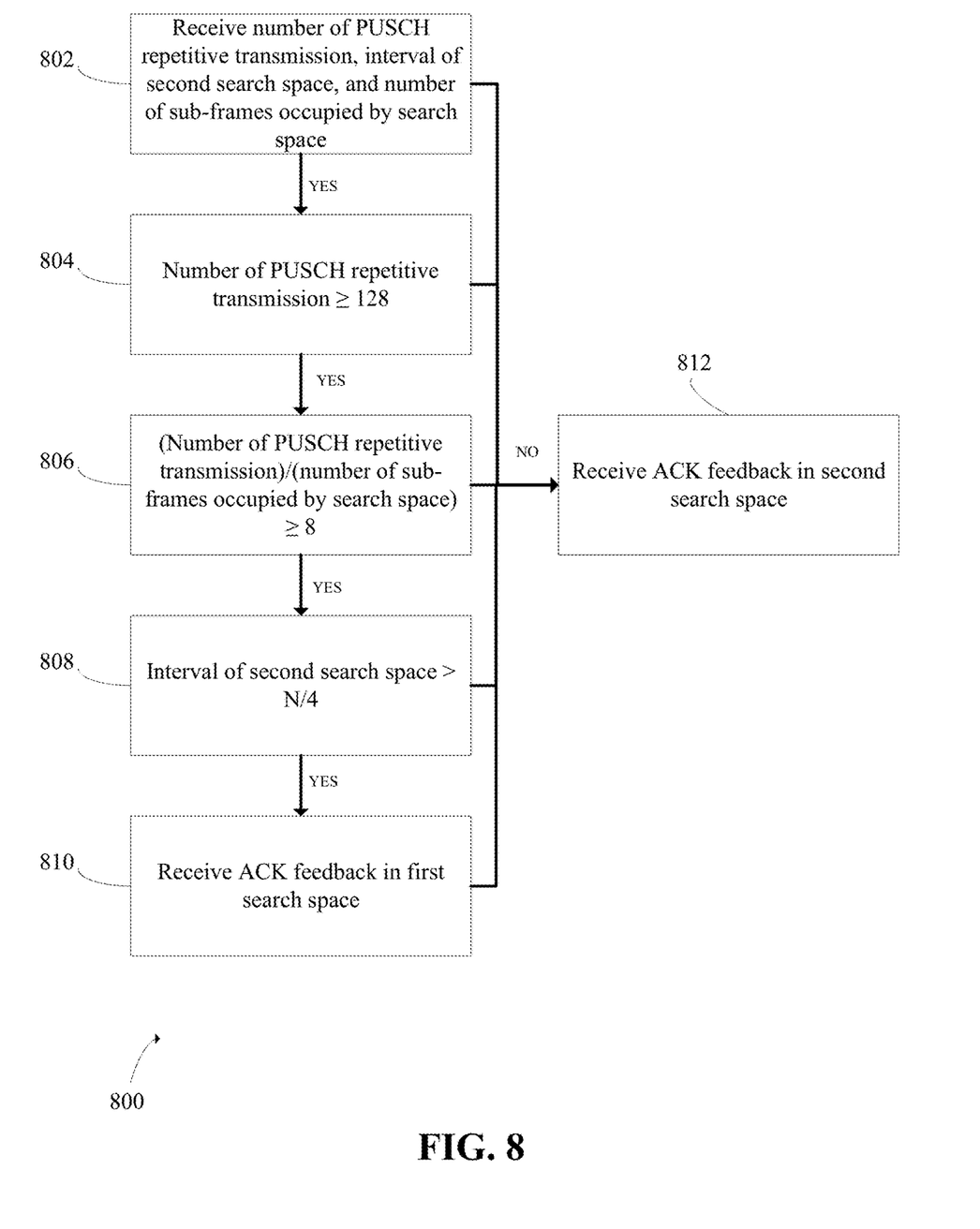
FIG. 8 illustrates another exemplary algorithm to determine whether a DCI bearing an ACK feedback is received in the first or second search space.

FIG. 8 illustrates another exemplary algorithm 800 to determine whether a DCI bearing an ACK feedback is received in the first or second search space. As shown in Step 802, the BS transmits the number of the PUSCH repetitive transmission, the interval of second search space, and the number of sub-frames occupied by the search space. Based on these received values, the UE determines whether to receive the second DCI in the first or second search space during the PUSCH repetitive transmission. In an embodiment, the UE will determine to receive the second DCI in the first search space during the PUSCH repetitive transmission when: (a) as shown in Step 804, the number of the PUSCH repetitive transmission is greater than or equal to 128; (b) as shown in Step 806, the number of the PUSCH repetitive transmission divided by the number of sub-frames occupied by the search space is greater than or equal to 8; and (c) as shown in Step 808, the interval of the second search space is greater than N/4. If Steps 804-808 are true, then as shown in Step 810, the UE uses the first search space to look for an ACK feedback. If any are untrue, the UE determines that it uses the second search space (Step 812) to look for an ACK feedback.

As an example, the UE will receive the second DCI in the first search space during the PUSCH repetitive transmission if: (a) the number of the PUSCH repetitive transmission is 512; (b) the number of sub-frames occupied by the search space is 64; and (c) the interval of the second search space is 256 sub-frames. In this case, because the number of the PUSCH repetitive transmission divided by the number of sub-frames occupied by the search space (i.e., 512/64) is equal to 8 and the interval of the second search space is greater than 128, the UE receives the second DCI in the first search space during the PUSCH repetitive transmission.

In another example, the UE will receive the second DCI in the second search space during the PUSCH repetitive transmission if: (a) the number of the PUSCH repetitive transmission is 1024; (b) the number of sub-frames occupied by the search space is 64; (c) and the interval of the second search space is 256 sub-frames. In this case, the number of the PUSCH repetitive transmission divided by the number of sub-frames occupied by the search space (i.e., 1024/64) equals to 16 but the interval of the second search space equals 256. Because the interval of the second search space is not greater than N/4 (i.e., 256 is not greater than 1024/4), the UE receives the second DCI in the second search space during the PUSCH repetitive transmission.

Like other embodiments, the numbers and relationships are only exemplary. The numbers (e.g., number of the PUSCH repetitive transmission and sub-frames occupied by the search space) can be any number. Furthermore, the relationships that trigger the UE knowing which search space to look to are also exemplary. This disclosure is not limited to the particular numbers and relationships described.

Figure 9:
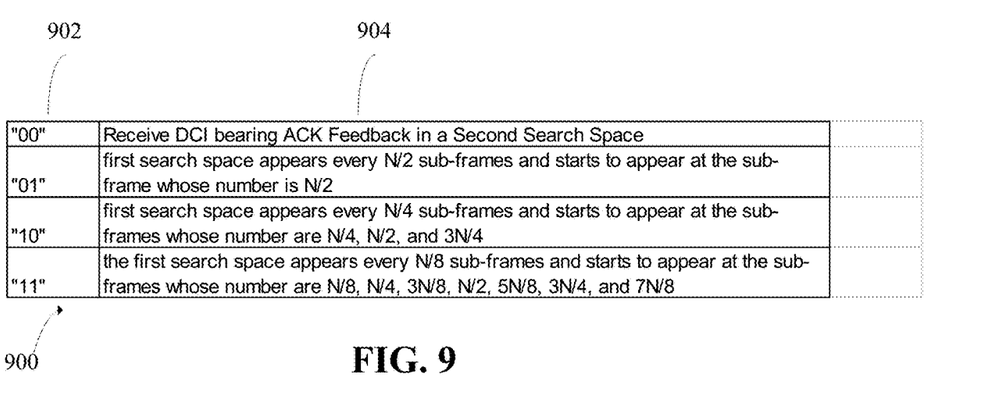
FIG. 9 illustrates an exemplary DCI field that indicates to the UE a time-domain position of the first search space.

FIG. 9 illustrates an exemplary DCI field 900 that indicates to the UE a time-domain position of the first search space. In an embodiment, the BS sends the first DCI to the UE for scheduling the PUSCH in the second search space, where the DCI has a field 900 that is used to indicate the time-domain position of the first search space. The UE uses the information received in the first DCI to determine the time-domain position of the first search space.

In an embodiment, the field can be 2-bits to indicate the time domain position of the first search space, and whether to use the first or second search space to receive a second DCI bearing an ACK feedback. The field values 902 indicate interpreted functions 904. For example, "00" can indicate to the UE to receive the second DCI in the second search space. "01" can indicate to the UE to receive the second DCI in the first search space, where the first search space appears every N/2 sub-frames and starts to appear at the sub-frame whose number is N/2. "10" indicates to the UE to receive the second DCI on the first search space, where the first search space appears every N/4 sub-frames and starts to appear at the sub-frames whose number are N/4, N/2, and 3N/4. "11" indicates to the UE to receive the second DCI in the first search space, where the first search space appears every N/8 sub-frames and starts to appear at the sub-frames whose number are N/8, N/4, 3N/8, N/2, 5N/8, 3N/4, and 7N/8. The first sub-frame for the PUSCH repetitive transmission is treated as the number 0 sub-frame.

Figure 10:
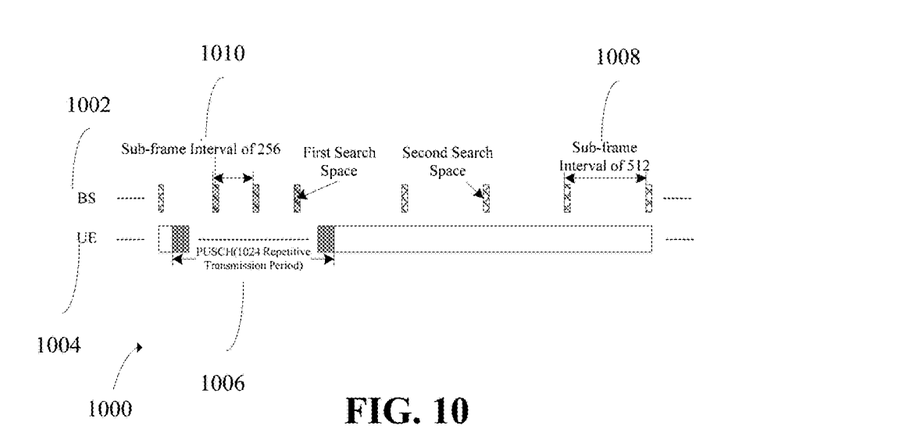
FIG. 10 illustrates an exemplary block diagram showing the transmission of sub-frames and PUSCH repetitive transmissions.

FIG. 10 illustrates an exemplary block diagram 1000 showing the transmission of sub-frames from the BS 1002 and a PUSCH repetitive transmission from the UE 1004. As an example, the number of the PUSCH repetitive transmission is 1024 (shown in element 1006), the interval of the second search space is 512 sub-frames (shown in element 1008), and the time-domain position of the first search space is signified by setting the 2-bit field of the first DCI to "10." Here, the first search space appears every 256 sub-frames (noted by element 1010) and appears in sub-frames whose numbers are 256, 512, and 768 during the PUSCH repetitive transmission.

In another example embodiment, the number of the PUSCH repetitive transmission is 512, the interval of second search space is 512 sub-frames, and the network side tells the UE the time domain position of first search space by setting the 2-bit field of the first DCI to "10." Here, the first search space appears every 128 sub-frames and starts to appear in sub-frames whose number are 128, 256 and 384 during the PUSCH repetitive transmission.

In an embodiment, the UE can determine the time-domain position of the first search space based on the number of the PUSCH repetitive transmission. For example, the first search space appears every N/K sub-frames and starts to appear at the sub-frames whose number are N/K, 2N/K, (K−1)N/K. The same value of K is used for different numbers of the PUSCH repetitive transmission. As an example, K is equal to 4, the number of the PUSCH repetitive transmission is 1024, and the interval of the second search space is 512 sub-frames. In this case, the first search space appears every 256 sub-frames and starts to appear in sub-frames whose numbers are 256, 512, and 768 during the PUSCH repetitive transmission. It should be understood that for different numbers of the PUSCH repetitive transmission, the value of K also can be different.

Figure 11:
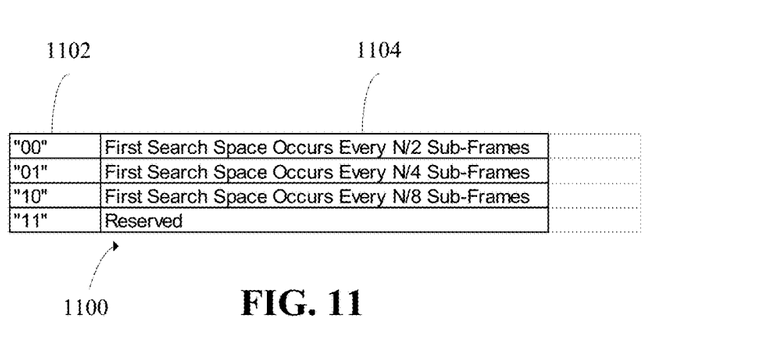
FIG. 11 illustrates the time domain position of the first search space being configured for the UE via the Radio Resource Control (RRC) message.

FIG. 11 illustrates the time domain position of the first search space being configured for the UE via the Radio Resource Control (RRC) message 1100. Based on the RRC message 1100, the UE determines the time domain position of the first search space received from a bit-value 1102 and its interpreted function 1104. For example, the time domain position of the first search space is arranged by the 2-bit field of the RRC message where: "00" indicates that the first search space appears every N/2 sub-frames and starts to appear at the sub-frame whose number is N/2; "01" indicates that the first search space appears every N/4 sub-frames and starts to appear at sub-frames whose number are N/4, N/2 and 3N/4; and "10" indicates the first search space appears every N/8 sub-frames and starts to appear sub-frames whose number are N/8, N/4, 3N/8, N/2, 5N/8, 3N/4 and 7N/8. Here, "11" is used as a reserved state. It should be understood that the length of the field and what its values represent are merely exemplary. Any bit field value can represent different sub-frame positions other than those described.

As an example, the number of the PUSCH repetitive transmission is 1024, the interval of second search space is 512 sub-frames, and the network-side configures the time domain position of first search space for the UE by setting the 2-bit field of the RRC message to "01." In this situation, the first search space appears every 256 sub-frames and starts to appear in sub-frames whose number are 256, 512 and 768 during the PUSCH repetitive transmission.

In another example, the number of the PUSCH repetitive transmission is 512, the interval of second search space is 512 sub-frames, and the network side configures the time domain position of first search space for the UE by setting the 2-bit field of the RRC message to "01." In this case, the first search space appears every 128 sub-frames and starts to appear in sub-frames whose number are 128, 256 and 384 during the PUSCH repetitive transmission.

Figure 12:
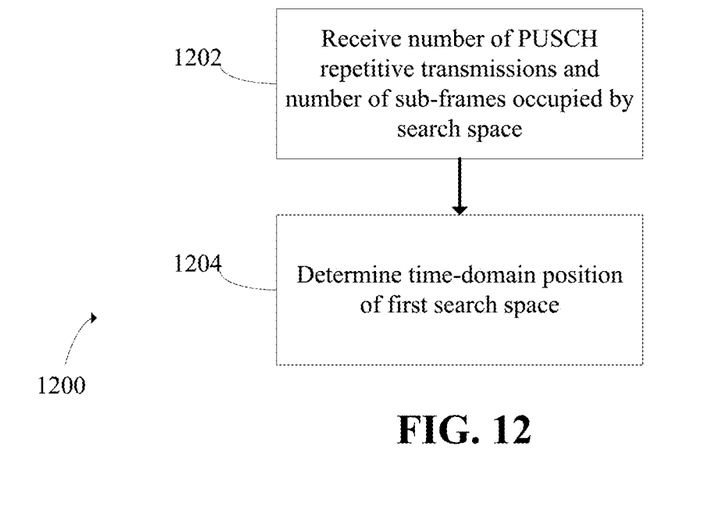
FIG. 12 illustrates an exemplary flowchart for the UE to determine the time-domain position of the first search space based on the number of PUSCH repetitive transmission and the number of sub-frames occupied by the search space.

FIG. 12 illustrates an exemplary flowchart 1200 for the UE to determine the time-domain position of the first search space based on the number of the PUSCH repetitive transmission and the number of sub-frames occupied by the search space. As shown in Step 1202, the UE receives the number of the PUSCH repetitive transmission and the number of sub-frames occupied by the search space to the UE. As shown in Step 1204, the UE determines the time-domain position of the first search space based on the received number of the PUSCH repetitive transmission and the number of occupied sub-frames by the search space.

Figure 13:
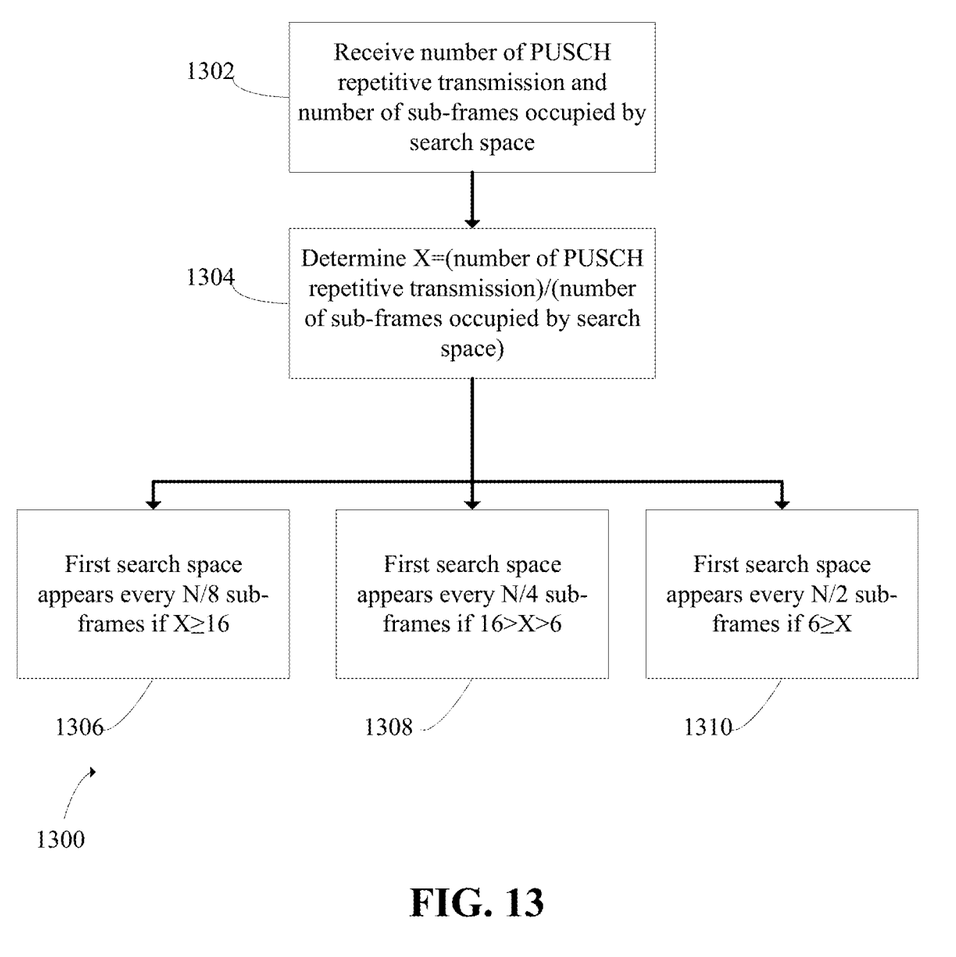
FIG. 13 illustrates an exemplary algorithm for the UE to determine the time-domain position of the first search space based on the number of PUSCH repetitive transmission and the number of sub-frames occupied by the search space.

FIG. 13 illustrates an exemplary algorithm 1300 for the UE to determine the time-domain position of the first search space based on the number of the PUSCH repetitive transmission and the number of sub-frames occupied by the search space. As shown in Step 1302, the UE receives the number of the PUSCH repetitive transmission and the number of sub-frames occupied by the search space. As shown in Step 1304, the UE determines the value of the PUSCH repetitive transmission number divided by the number of sub-frames occupied by the search space. As shown in Step 1306, if the value is greater than or equal to 16, the first search space appears every N/8 sub-frames. As shown in Step 1308, if the value is greater than 6 and less than 16, the first search space appears every N/4 sub-frames. As shown in Step 1310, if the value is less than or equal to 6, the first search space appears every N/2 sub-frames. The above mentioned two threshold values (i.e., 16 and 6) and corresponding three search space intervals (i.e., N/8, N/4, and N/2) are merely illustrative. It should be understood that any number of threshold values can be used, and any threshold values and search space intervals can be used.

Figure 14:
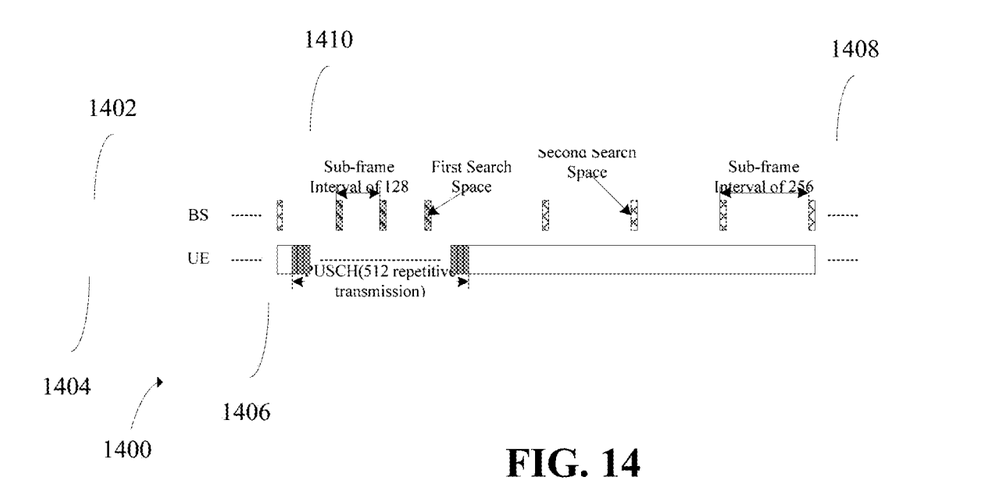
FIG. 14 illustrates an exemplary block diagram showing the transmission of sub-frames from the BS and PUSCH repetitive transmissions from the UE.

FIG. 14 illustrates an exemplary block diagram 1400 showing the transmission of sub-frames from the BS 1402 and the PUSCH repetitive transmission from the UE 1404. In an example embodiment, the number of the PUSCH repetitive transmission is 512 (noted by element 1406), the number of sub-frames occupied by the search space is 64 (not illustrated), and the interval of the second search space is 256 sub-frames (noted by element 1408). In an embodiment, the first DCI having scheduling information for the PUSCH is received in the second search space outside of the PUSCH repetitive transmission. Here, because the number of the PUSCH repetitive transmission divided by the number of sub-frames occupied by the search space is 8, the first search space appears every 128 sub-frames and starts to appear in sub-frames whose number are 128, 256 and 384 during the PUSCH repetitive transmission. In another embodiment, the number of the PUSCH repetitive transmission is 1024, the number of sub-frames occupied by the search space is 64, and the interval of second search space is 256 sub-frames. Because the number of the PUSCH repetitive transmission divided by the number of sub-frames occupied by the search space is 16, the first search space appears every 128 sub-frames and starts to appear in sub-frames whose number are 128, 256,384, 512, 640, 768 and 896 during the PUSCH repetitive transmission.

In another embodiment, the network side sends an RRC message to configure the UE to receive the second DCI in the first search space before the UE determines whether to receive the second DCI in the first search space during the PUSCH repetitive transmission. The UE use the RRC message to determine whether it should receive the second DCI in the first search space.

Figure 15:
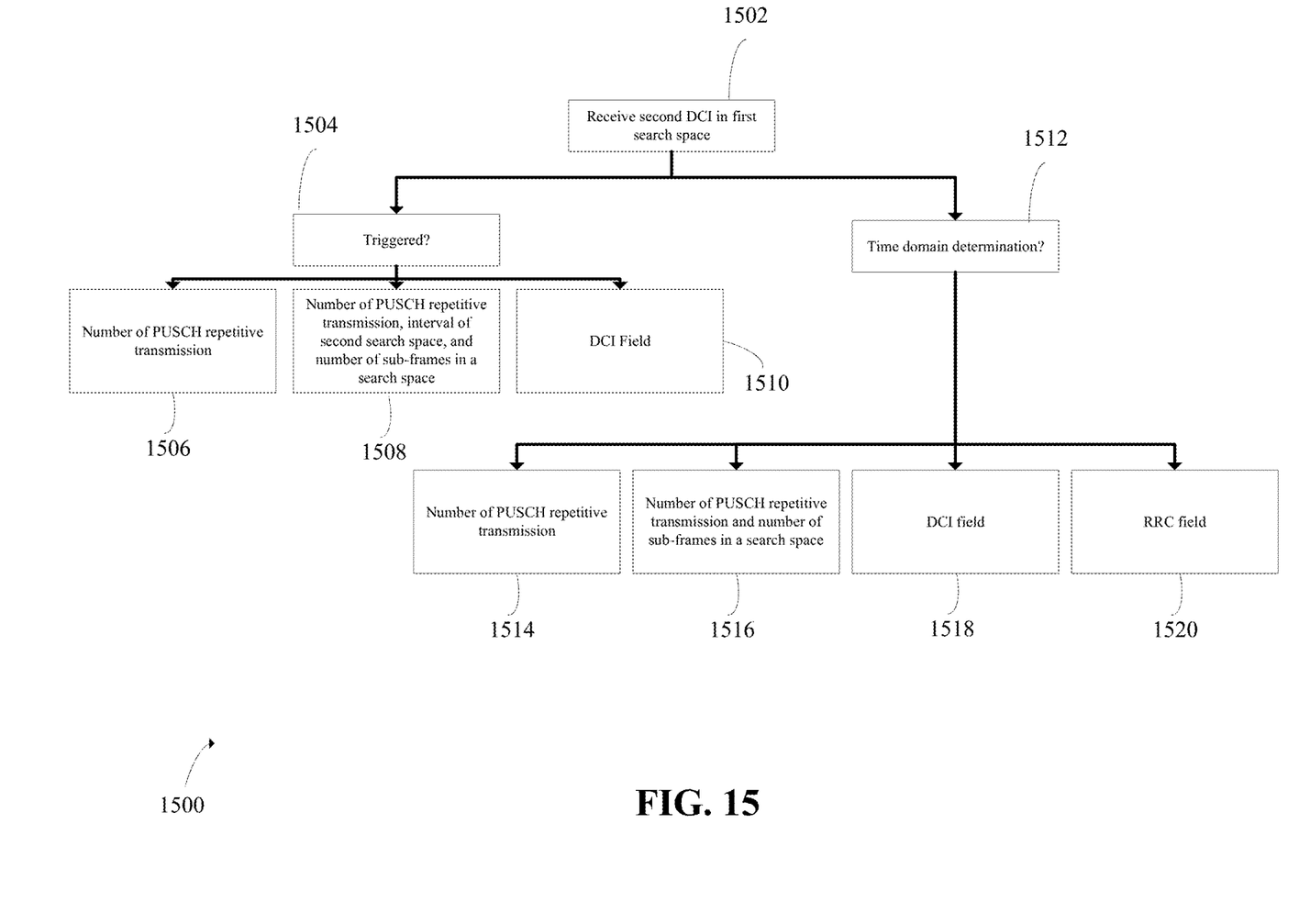
FIG. 15 illustrates a block diagram 1500 that illustrates examples of how the UE can be triggered to search for ACK feedback in the first search space and how the UE can determine the time-domain position of the first search space.

FIG. 15 illustrates an block diagram 1500 that illustrates embodiments regarding how the UE can be triggered to search a DCI for ACK feedback in the first search space (1502) and how the UE can determine the time-domain position of the first search space. The usage of the first search space is triggered (1504) based on many scenarios, including: number of the PUSCH repetitive transmission (1506), number of the PUSCH repetitive transmission, second search space interval, and number of sub-frames in the search space (1508), and values in a DCI field (1510). The time-domain of the search space (1512) can be determined based on many scenarios, including: number of the PUSCH repetitive transmission (1514), number of the PUSCH repetitive transmission and number of sub-frames in the search space (1516), a DCI field (1518), and an RRC field (1520).

In some embodiments, the DCI for the ACK feedback includes common DCI and the UE-specific DCI. The UE-specific DCI includes the DCI for scheduling a new PUSCH and the specific DCI for ACK feedback.

The network-side determines what type of DCI should be used to send ACK feedback. Simultaneously, the UE needs to detect the common DCI and UE-specific DCI. When a new PUSCH needs to be scheduled, the network-side can implicitly indicate the ACK feedback by sending the DCI for scheduling the new PUSCH and the UE obtains the ACK feedback by receiving the DCI. Otherwise, the network side can determine to send the ACK feedback either through the common DCI or the specific DCI for ACK feedback. The UE obtains the ACK feedback by receiving the common DCI or the specific DCI for ACK feedback.

The common DCI may simultaneously carry a plurality of ACK feedback corresponding to a plurality of UEs, where each ACK feedback for each UE corresponds to one bit in the information. The network side sends the common DCI in the first candidate set of the search space and the UE receives the common DCI in the first candidate set of the search space. The first candidate set contains maximum number of control channel elements.

In an embodiment, available candidate sets in the search space include: {8,R1,1}{8,R2,1}{8,R3,1}{8,R4,1}, {16,R1,1}{16,R2,1}{16,R3,1}{16,R4,1}, {24,R1,1}{24,R2,1}{24,R3,1}{24,R4,1}, where {X, Y} corresponds to a candidate set. X represents the number of control channel elements of the candidate set, $R_j$ represents the number of repetitive transmissions of the candidate set, and Y represents the number of blind detection of the candidate set. In this case, the first candidate set includes:

[{{24,R1,1}{24,R2,1}{24,R3,1}{24,R4,1}}].

It should be understood that the above numbers and candidate sets are merely illustrative and any values can be used.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Only a few implementations and examples are described and other implementations, enhancements, and variations can be made based on what is described and illustrated in this disclosure.

What is claimed is:

1. A wireless communication method, comprising:
receiving, from a base station (BS), a first control information in a second search space in at least one sub-frame, wherein the first control information comprises information relating to scheduling of a transmission from a user equipment (UE) to the BS, wherein the transmission is a Physical Uplink Shared Channel (PUSCH);
transmitting the transmission at least once, wherein the transmission utilizes one or more sub-frames, the one or more sub-frames of the transmission has a different time domain position than that of the at least one sub-frame that includes the first control information;
receiving, a second control information in a first search space or the second search space during the transmission, wherein the second control information comprises an acknowledgement (ACK) feedback that acknowledges that the BS received the transmission; and
determining whether to receive the second control information in the first search space or the second search space, the determining comprising:
receiving a signal that indicates a PUSCH repetitive transmission number;
receiving a signal that indicates the time-domain interval number of the second search space; and
determining, based on the PUSCH repetitive transmission number and the time-domain interval number of the second search space, whether the second control information will be received in the first search space or the second search space.

2. The method according to claim 1, wherein the second search space utilizes a sub-frame that is different than a sub-frame utilized by the first search space in the time-domain.

3. The method according to claim 1, wherein the first control information further comprises a field value that indicates whether the second control information will be received in the first search space or the second search space.

4. The method according to claim 1, further comprising:
receiving a signal that indicates a number of sub-frames in the first or the second search space, and
determining time-domain position of the first search space based on the PUSCH repetitive transmission number and the number of sub-frames in the first or second search space.

5. A user equipment (UE) apparatus comprising:
a processor configured to:
receive, from a base station (BS), a first control information in a second search space, where the first control information comprises information relating to scheduling of a transmission from the UE to the BS, wherein the transmission is a Physical Uplink Shared Channel (PUSCH);
transmit the transmission at least once, where the transmission utilizes one or more sub-frames, the one or more sub-frames of the transmission has a different time domain position than that of the at least one sub-frame that includes the first control information;

receive a second control information in a first search space or the second search space during the transmission, where the second control information comprises an acknowledgement (ACK) feedback that acknowledges that the BS received the transmission; and determine whether to receive the second control information in the first search space or the second search space by:
receive a signal that indicates a PUSCH repetitive transmission number;
receive a signal that indicates the time-domain interval number of the second search space; and
determine, based on the PUSCH repetitive transmission number and the time-domain interval number of the second search space, whether the second control information will be received in the first search space or the second search space.

6. The apparatus according to claim 5, wherein the second search space utilizes a sub-frame that is different than a sub-frame utilized by the first search space in the time-domain.

7. The apparatus according to claim 5, wherein the first control information further comprises a field value that indicates whether the second control information will be received in the first search space or the second search space.

8. The apparatus according to claim 5, wherein the processor is further configured to:
receive a signal that describes a number of sub-frames in the first or the second search space, and
determine time-domain position of the first search space based on the PUSCH repetitive transmission number and the number of sub-frames in the first or second search space.

9. A wireless communication method, comprising:
transmitting a first control information in a second search space in at least one sub-frame, wherein the first control information comprises information relating to scheduling of a transmission from a user equipment (UE) to a base station (BS), wherein the transmission is a Physical Uplink Shared Channel (PUSCH);
receiving, from the UE, the transmission at least once, wherein the transmission utilizes one or more sub-frames, the one or more sub-frames of the transmission has a different time domain position than that of the at least one sub-frame that includes the first control information; and
transmitting, a second control information in a first search space or the second search space during the transmission, wherein the second control information comprises an acknowledgement (ACK) feedback that acknowledges that the BS received the transmission,
wherein whether the second control information is in the first search space or the second search space is indicated by:
transmitting a signal that indicates a PUSCH repetitive transmission number; and
transmitting a signal that indicates a time-domain interval number of the second search space,
wherein whether the second control information will be transmitted in the first search space or the second search space is based on the PUSCH repetitive transmission number and the time-domain interval number of the second search space.

10. The method according to claim 9 wherein the second search space utilizes a sub-frame different than a sub-frame utilized by the first search space in time-domain.

11. The method according to claim 9, wherein the first control information further comprises a field value that indicates whether the second control information will be transmitted in the first search space or the second search space.

12. A base station (BS) apparatus comprising:
a processor configured to:
transmit a first control information in a second search space in at least one sub-frame, wherein the first control information comprises information relating to scheduling of a transmission from a user equipment (UE) to the BS, wherein the transmission is a Physical Uplink Shared Channel (PUSCH);
receive the transmission at least once, where the transmission utilizes one or more sub-frames, the one or more sub-frames of the transmission has a different time domain position that that of the at least one sub-frame that includes the first control information; and
transmit a second control information in a first search space or the second search space during the transmission, where the second control information comprises an acknowledgment (ACK) feedback that acknowledges that the BS received the transmission,
wherein whether the second control information is in the first search space or the second search space is indicated by:
transmit a signal that indicates a PUSCH repetitive transmission number; and
transmit a signal that indicates a time-domain interval number of the second search space,
wherein whether the second control information will be transmitted in the first search space or the second search space is based on the PUSCH repetitive transmission number and the time-domain interval number of the second search space.

13. The apparatus according to claim 12 wherein the second search space utilizes a sub-frame different than a sub-frame utilized by the first search space in time-domain.

14. The apparatus according to claim 12, wherein the first control information further comprises a field value that indicates whether the second control information will be transmitted in the first search space or the second search space.

* * * * *

UNITED STATES PATENT AND TRADEMARK OFFICE
CERTIFICATE OF CORRECTION

PATENT NO. : 11,147,095 B2
APPLICATION NO. : 16/785553
DATED : October 12, 2021
INVENTOR(S) : Xianming Chen et al.

Page 1 of 1

It is certified that error appears in the above-identified patent and that said Letters Patent is hereby corrected as shown below:

In the Specification

Column 1, Line 37, delete "of a for" and insert -- for --, therefor.

Column 4, Line 62, delete "DCI in avoids" and insert -- DCI avoids --, therefor.

Column 11, Line 31, delete "number" and insert -- numbers --, therefor.

Column 11, Line 39, delete "number" and insert -- numbers --, therefor.

Column 12, Line 36, delete "use" and insert -- uses --, therefor.

Column 12, Line 39, delete "an block" and insert -- a block --, therefor.

Column 13, Line 14, delete "{X, Y}" and insert -- {X, $R_j$, Y} --, therefor.

Column 13, Line 36, delete "(DVD)," and insert -- (DVDs), --, therefor.

In the Claims

Column 15, Line 5, Claim 5, delete "transmission," and insert -- transmission; --, therefor.

Column 16, Line 28, Claim 12, delete "that that" and insert -- than that --, therefor.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*